(12) United States Patent
Box (10) Patent No.: US 11,617,945 B2
(45) Date of Patent: Apr. 4, 2023

(54) GAME CONTROLLER WITH SCROLL WHEEL

(71) Applicant: QTECH INNOVATIONS LLC, University City, MO (US)

(72) Inventor: Quincy Box, Saint Louis, MO (US)

(73) Assignee: QTECH INNOVATIONS LLC, University City, MO (US)

( * ) Notice: Subject to any disclaimer, the term of this patent is extended or adjusted under 35 U.S.C. 154(b) by 0 days.

(21) Appl. No.: 17/499,674

(22) Filed: Oct. 12, 2021

(65) Prior Publication Data

US 2022/0152482 A1     May 19, 2022

Related U.S. Application Data (60) Provisional application No. 63/113,698, filed on Nov. 13, 2020.

(51) Int. Cl.
*A63F 13/20* (2014.01)
*A63F 13/24* (2014.01)
*G06F 3/0362* (2013.01)

(52) U.S. Cl.
CPC ............ *A63F 13/24* (2014.09); *G06F 3/0362* (2013.01)

(58) Field of Classification Search
CPC .......... A63F 13/20; A63F 13/24; G06F 3/033; G06F 3/0362
See application file for complete search history.

(56) References Cited

U.S. PATENT DOCUMENTS

| | | | | |
|---|---|---|---|---|
| 6,128,006 A | * | 10/2000 | Rosenberg | G06F 3/0485 345/184 |
| 6,312,335 B1 | * | 11/2001 | Tosaki | A63F 13/428 463/37 |
| 6,929,543 B1 | * | 8/2005 | Ueshima | A63F 13/218 463/7 |
| 10,946,279 B1 | * | 3/2021 | Juenger | A63F 13/795 |
| 2002/0103025 A1 | * | 8/2002 | Murzanski | A63F 13/285 463/37 |
| 2005/0099389 A1 | * | 5/2005 | Ma | G06F 3/03543 345/158 |
| 2006/0279529 A1 | * | 12/2006 | Kitazawa | G06F 1/1616 345/156 |
| 2014/0049558 A1 | * | 2/2014 | Krauss | G02B 27/017 345/633 |

(Continued)

FOREIGN PATENT DOCUMENTS

| | | | | |
|---|---|---|---|---|
| CN | 1178478 A | * | 4/1998 | ............. A63F 13/02 |
| FR | 2917602 A1 | * | 12/2008 | |
| WO | WO-2004081696 A2 | * | 9/2004 | ............. A63F 13/06 |

*Primary Examiner* — Joe H Cheng
(74) *Attorney, Agent, or Firm* — Gray Reed (57) ABSTRACT

A video game controller is provided with at least one rotatable input mechanism such as a "scroll wheel". The rotatable input mechanism is disposed within the body of the controller but protrudes partially through an aperture to allow a user to rotate the mechanism using a finger or thumb. The rotatable input mechanism may be positioned so that the user may rotate the mechanism while gripping the controller body with the same hand. The input from the rotatable input mechanism may be used to control various software functions, such as video game functions. In some versions the controller comprises a Gamepad style controller with a scroll wheel disposed at the thumb area of one or both of the hand grips.

20 Claims, 7 Drawing Sheets

(56) References Cited

U.S. PATENT DOCUMENTS

2014/0364212 A1\* 12/2014 Osman ................ A63F 13/537
                                                  463/31
2021/0248984 A1\*  8/2021 Tew .................... G10H 1/0091
2021/0252388 A1\*  8/2021 VanWyk ............... A63F 13/24

\* cited by examiner

GAME CONTROLLER WITH SCROLL WHEEL

CROSS-REFERENCE TO RELATED APPLICATIONS

This application claims the benefit of U.S. Provisional Patent Application Ser. No. 63/113,698 filed on Nov. 13, 2020, the disclosure of which is incorporated herein by reference.

BACKGROUND

Field of the Invention

This disclosure is in the field of controllers used for video games. More specifically, this disclosure is in the field of improved input mechanisms for video game controllers.

Description of the Related Art

A controller, also known as a game operating device, is a hand-held device comprised of a hardened case commonly referred to as the housing, internal components, and in many instances, a cord used to attach the controller to a game application, television, game console, or other platform or electronic device. A game controller facilitates and enhances communication and integration, such as providing options for a user to control objects, characters, and their movements. Controllers are manually manipulated by users and are responsible for sending signals to the computer, game, or other device.

Controllers are frequently equipped with accessories such as triggers, buttons, and joysticks, which produce various control signals for interacting with a video game and enhance the users' experience. A variety of different types of game controllers exist and each game controller type may include one or more control elements via which a user can provide input. Improved actuators and control elements are needed to enhance the enjoyability playing video games.

SUMMARY OF THE INVENTION

In various embodiments, the improved game controller comprises a hand-held control device with at least one grip member, and a rotatable input mechanism such as a scroll wheel disposed on the grip member. When a user grips the grip member the rotatable input mechanism is disposed within reach of the user's thumb or another finger. The user may provide control input to the controller by rotating the rotatable input mechanism with a thumb or other finger.

DETAILED DESCRIPTION

The improved game controller with a rotatable input mechanism such as a scroll wheel provides two-dimensional input for controlling or otherwise interacting with a video game or other application.

A scroll wheel is a circular component, attached to other electrical components within a device, used to achieve communication between the input and output devices. Scroll wheels can be found in computer mice, telephones, and keyboards. In many instances, the scroll wheel emits a faint click sound when being manipulated and has a detent mechanism to provide feedback to the user of the amount of rotary movement. In some embodiments the rotatable input mechanism is a scroll wheel, but in other embodiments it may be a portion of a wheel or other device that is rotatable to create input such as a sphere or other shape.

As depicted in FIGS. 1 through 5, embodiments of the improved game controller have a scroll wheel attached internally to other components within the controller. In the depicted embodiment the scroll wheel mechanism 2 is mounted in the right hand grip area of a gamepad-style controller. In the depicted embodiment a user could rotate the wheel mechanism 2 in either direction using a thumb without releasing their grip on the grip member. The users other fingers remain positioned adjacent to other input mechanisms on the game controller while they actuate the scroll wheel.

Figure 1:
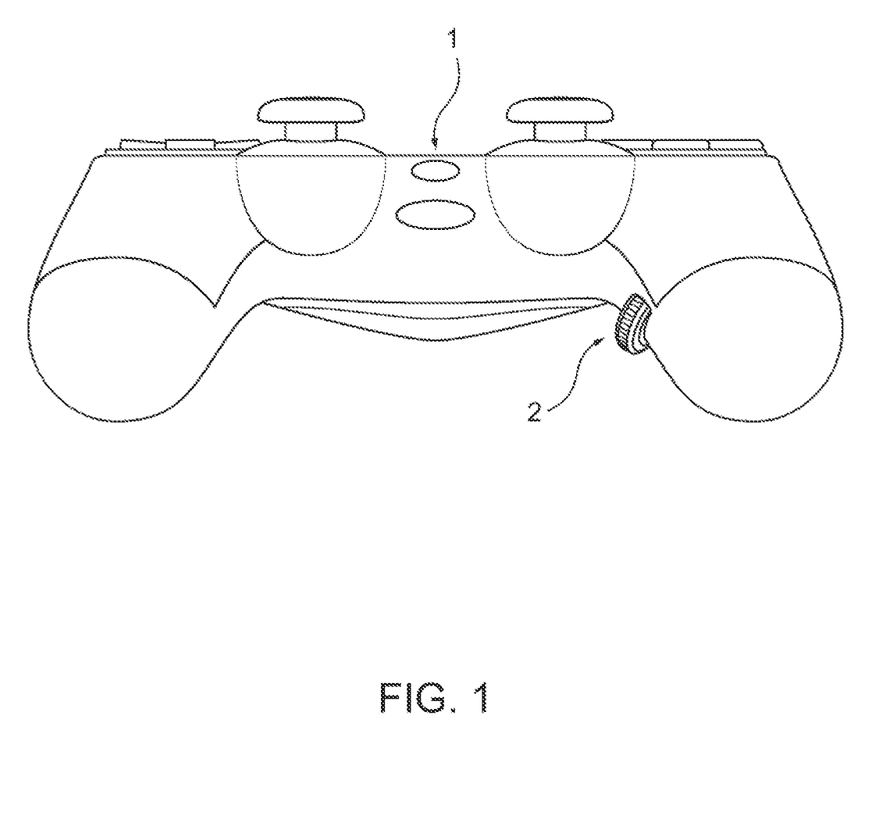
FIG. 1 is a side view of an embodiment of the improved game controller with a rotatable input mechanism.
Figure 2:
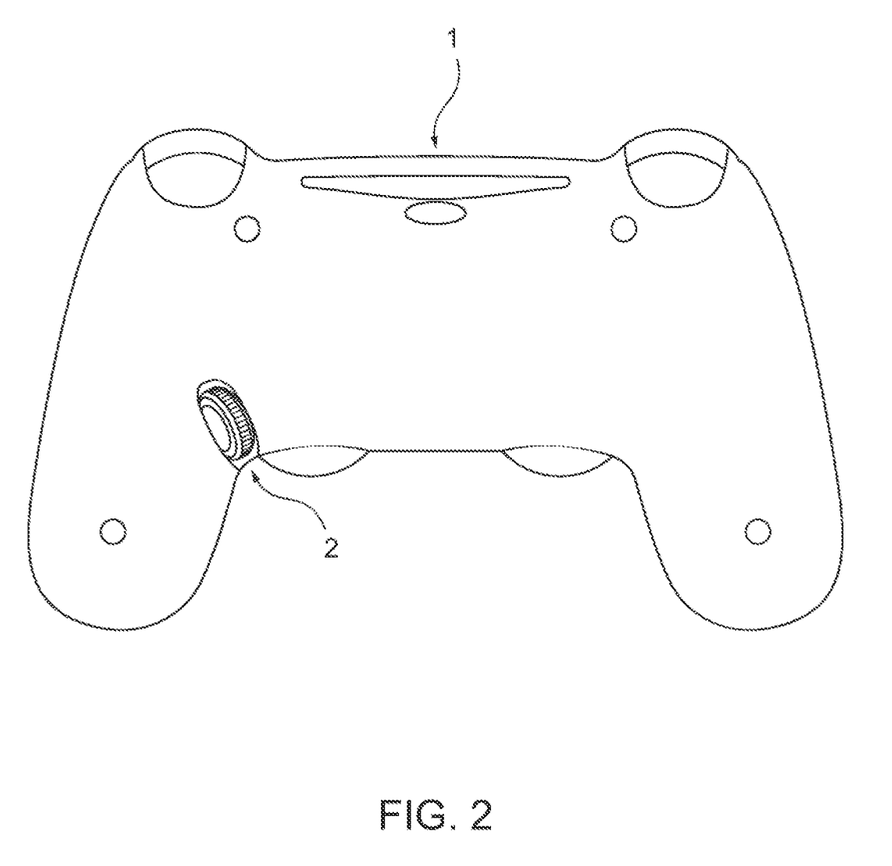
FIG. 2 is a bottom view of an embodiment of the improved game controller with a rotatable input mechanism.

FIG. 2 depicts the embodiment of the controller from below and shows the rotatable input mechanism, in this embodiment a scroll wheel, 2 disposed adjacent to the grip held by the user's right hand. In other embodiments the scroll wheel 2 may be disposed adjacent to the left hand grip, or there may be a scroll wheel on both grips.

Figure 3:
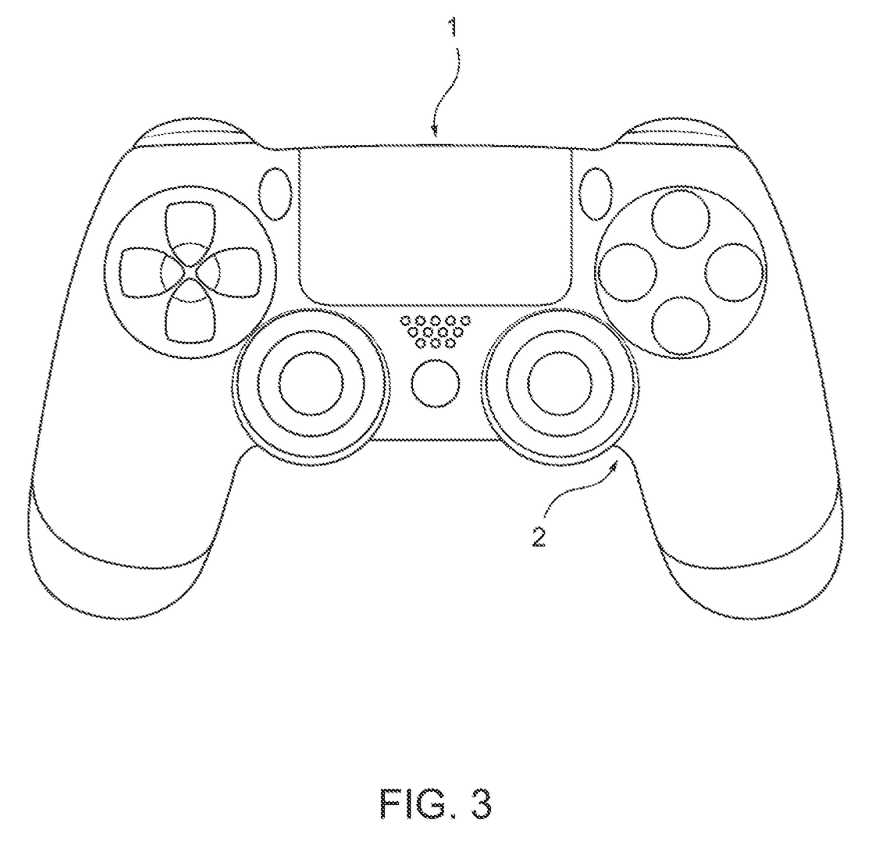
FIG. 3 is a top view of an embodiment of the improved game controller with a rotatable input mechanism.

FIG. 3 depicts the embodiment of the controller from above and the scroll wheel 2 is not visible. In other embodiments of the controller, the scroll wheel 2 may be disposed on the side or even the top of the body 1 of the controller.

Figure 4A:
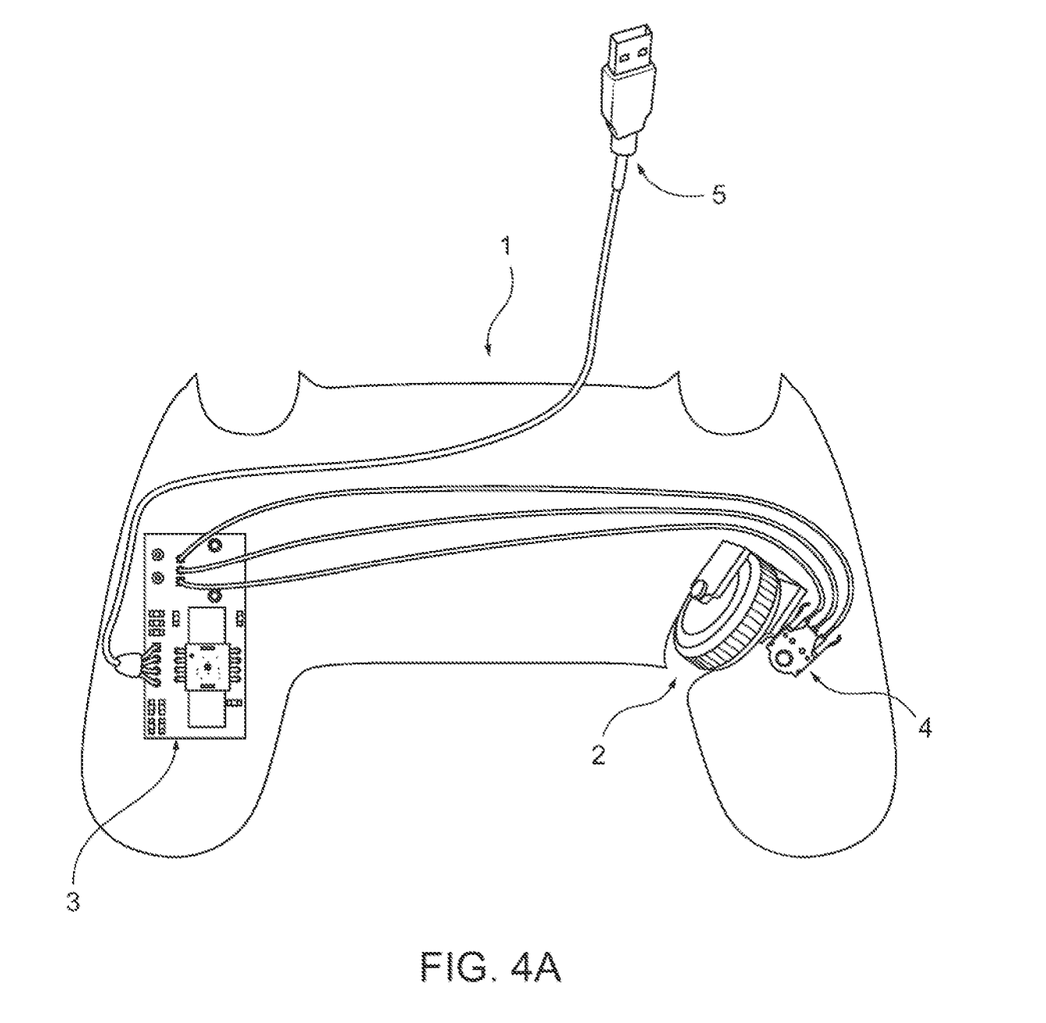
FIG. 4A is a cutaway top view of an embodiment of the improved game controller with a rotatable input mechanism.
Figure 4B:
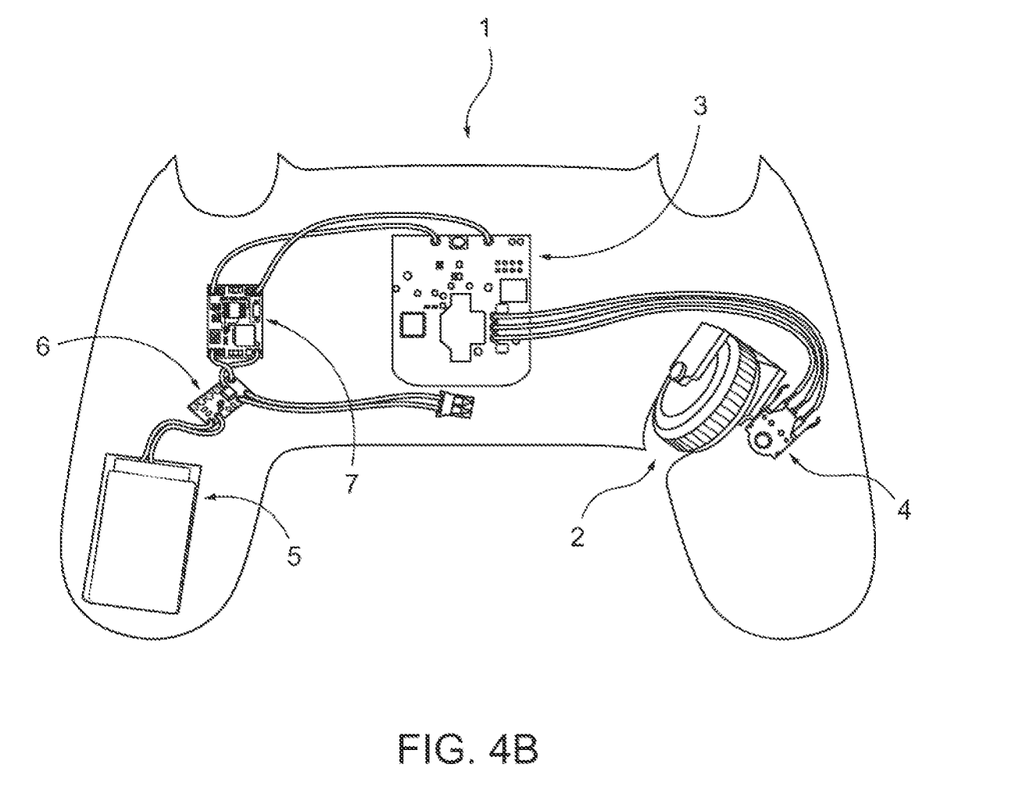
FIG. 4B is a cutaway top view of an embodiment of the improved game controller with a rotatable input mechanism.

As can be see in FIGS. 4A and 4B the scroll wheel in this embodiment is a disk-shaped wheel mounted on an axis disposed inside of the body 1 of the controller. While mounted internally, a portion of the scroll wheel protrudes externally through the body for manual manipulation by the user. Users are required to apply a minimum amount of pressure to move the scroll wheel in different directions. Increasing or decreasing the force, speed, and directional movement of the scroll wheel will increase or decrease the signals to the accepting device. These movements will be reflected in the accepting device's user interface.

In a typical embodiment, the scroll wheel is attached to a printed circuit board 3 that is disposed within a housing or body of a game controller and is designed to be manipulated by a user's finger or thumb while they grip the video game controller with the same hand. The attachment in one such embodiment is shown as the electrical wires 4 in FIGS. 4A and 4B. In preferred embodiments, there is a central hole, or aperture, in the controller and the external portion of the scroll wheel protrudes through the hole in order to be manipulated by a user's finger.

While many users will engage with the scroll wheel in a substantially similar manner, some users will be able to improve his or her gaming experience by having faster reaction times and by not having to wait on the games' reset feature. Scroll wheel usage preferences may develop based on the feature of the particular video game that the user intends to play. Different users can utilize the scroll wheel for different purposes and advantages.

This scroll wheel is made to operate within wired or wireless devices. FIG. 4A depicts a typical installation in a wired device via a cable interface 5. FIG. 4B depicts a typical installationin a wireless device via a wireless interface 5. In the wireless embodiment, additional electronic circuits 6 and 7 may be required to connect the controller to the game system. The scroll wheel will maintain its functionality with tethered devices as well as those communicating via electromagnetic signals. With wireless game controllers, all circuit boards and other wireless hardware is placed in the controller.

Figure 5:
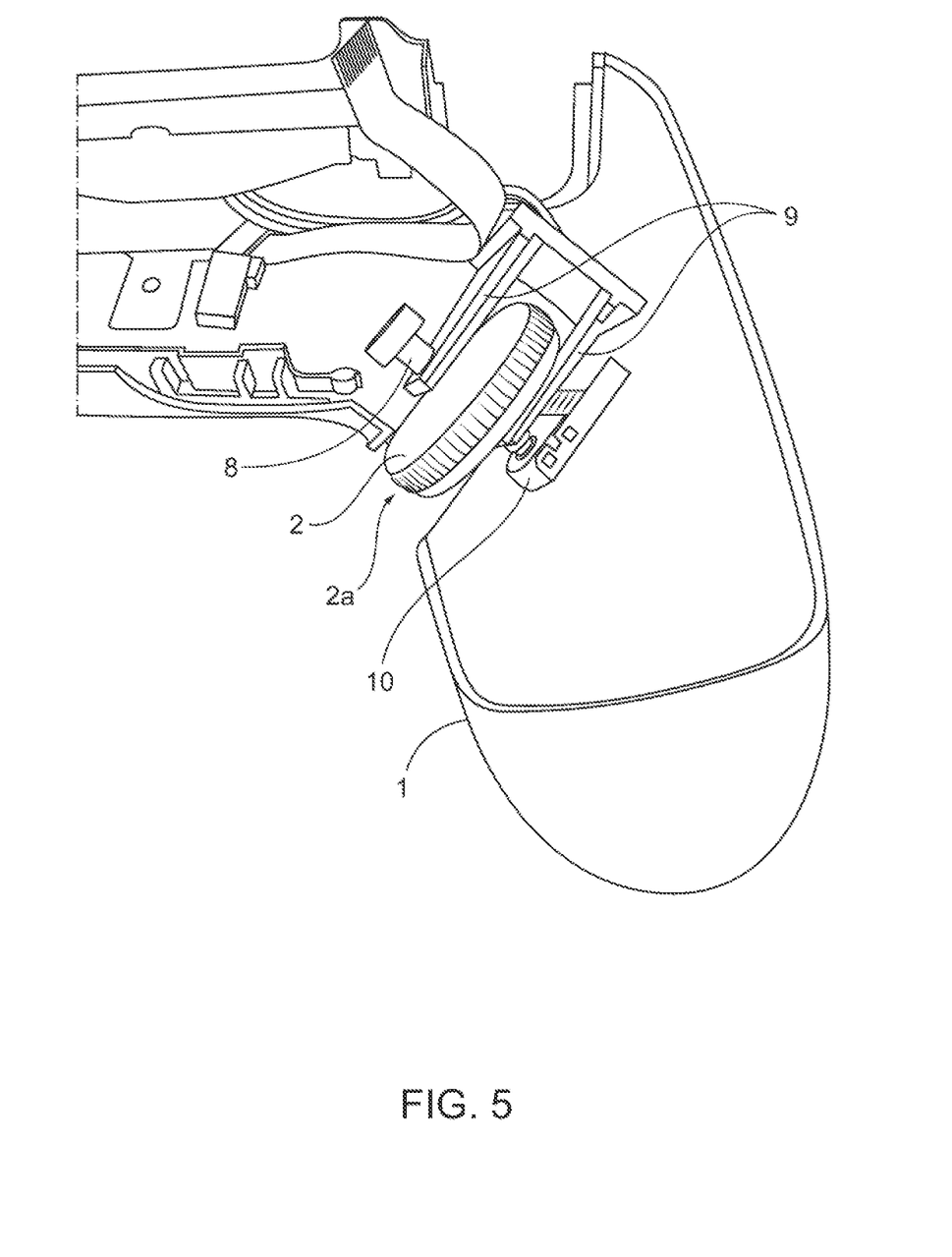
FIG. 5 is a detail cutaway view of an embodiment of the improved game controller with a rotatable input mechanism.

Referring now to FIG. 5, a detail view of an embodiment of the improved game controller is depicted with a portion the top panel of the controller cutaway to reveal the interior of the controller. In this embodiment, the controller body 1 is provided with one or more brackets 9 for supporting the scroll wheel mechanism 2. In this embodiment the brackets 9 are provided with slots or holes for receiving and rotatably supporting an axle 8 of the scroll wheel mechanism 2. In a preferred embodiment the scroll wheel 2a is attached to the axle 8 and held by brackets 9 so that a portion of the wheel 2a extends through an aperture in the controller body 1 so that a user may rotate the wheel 2. In other embodiments the wheel 2 may rotate on axle 8, while axle 8 is fixed in relation to body 1 or brackets 9.

Figure 6:
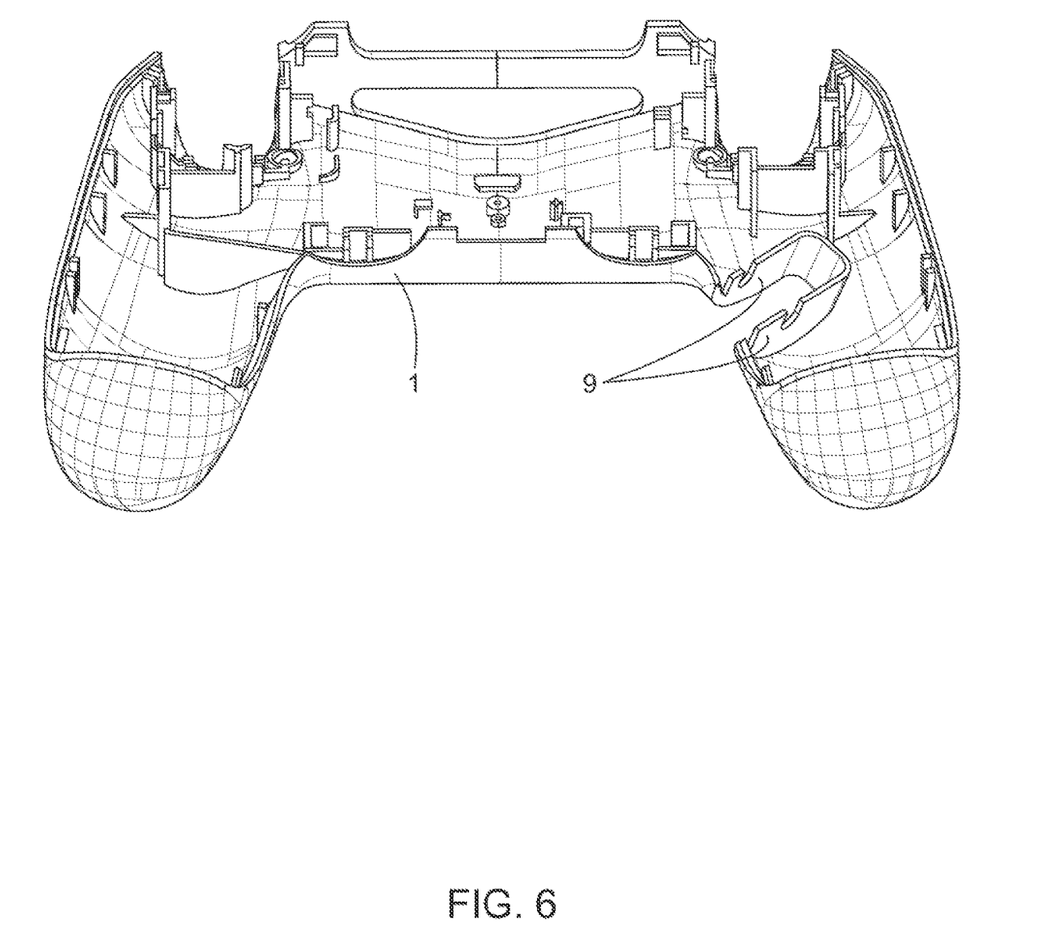
FIG. 6 is a perspective view of a portion of an embodiment of the improved game controller.

FIG. 6 depicts a portion of the body 1 of an embodiment of the improved controller. This embodiment has side surfaces 9 of the aperture in the body. The side surfaces 9 act as the brackets 9 to hold the rotatable input mechanism. Slots or holes provided in the side surfaces may be provided to receive the rotatable input mechanism by an axle 8 or otherwise. Another portion of the body 1, such as a top component, may close the slots and secure the rotatable mechanism in the aperture. In such embodiments the entire rotatable mechanism may be disposed in a chamber formed by the side surfaces 9 of the body 1. The rotational movement may be transferred to the electronic components of the controller by an axle or other connection through the side surface 9 of body 1, or a transducer may convert the rotation to an electric signal outside the body and deliver it to the electronic components of the controller by electrical or wireless connection.

In other embodiments the rotatable input mechanism may be a external component attached to a pre-existing controller device that is not provided with the rotatable input mechanism.

In various embodiments of the device, the axle 8 is connected to a motion or distance sensor 10 to convert the physical position of the axle 8 into an electronic signal for use by the game system or other electronics system. In some embodiments the position and movement sensor may comprise a rotary encoder attached to the axle 8. In other embodiments a laser and sensor may detect movement of the wheel by apertures in the wheel. Other methods of detecting motion of the wheel, and preferably its direct as well, will be apparent to one of skill in the art of such control systems, and are not limiting of the claimed invention.

"Substantially" or "about" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An improved controller device comprising:
a body having a top side and bottom side, the top side having a control button area and the bottom side located opposite the top side;
a first grip member configured to receive a first hand of a user;
a second grip member configured to receive a second hand of the user;
wherein each of the first and second grip members have a corresponding top side and a botttom side, wherein each said top side of the first and second grip members is adjacent said top side of said body, and each said bottom side of the first and second grip members is adjacent said bottom side of said body; and
a wheel rotatably mounted in and extending through an aperture in an interior portion of at least one of the first grip member or the second grip member, wherein the wheel is disposed on said bottom side adjacent a thumb area of the first or the second grip member.

2. The improvement of claim 1 further comprising a motion sensor for detecting rotational movement of the wheel.

3. The improvement of claim 2 where the motion sensor communicates movement of the wheel to a game console.

4. The improvement of claim 1 wherein the controller device has an input mechanism attached to the body, and wherein the wheel is configured to be rotated by a user's thumb while the user's other fingers engage the input mechanism.

5. The improvement of claim 1 wherein the wheel is configured to be rotated by a user's thumb while the first hand of the user holds the first grip member.

6. An improved controller device comprising:
a body comprising a top side and a bottom side, the top side having a control button area and the bottom side located opposite the top side, wherein said body further comprises:

a first grip member configured to receive a first hand of the user; and a second grip member configured to receive a second hand of the user; and a wheel rotatably attached to a bottom side of one of the first grip member or the second grip member, wherein a portion of the wheel extends through a hole in the bottom side of the first grip member or the second grip member.

7. The controller device of claim 6 wherein the hole is disposed adjacent to the first grip member.

8. The controller device of claim 7 wherein the wheel is disposed adjacent to a user's thumb when the user grips the first grip member.

9. The controller device of claim 8 further comprising a motion sensor configured to detect rotation of the wheel by the user.

10. An improved controller device comprising:

a body comprising a top side and a bottom side, the top side having a control button area and the bottom side located opposite the to side wherein said body further comprises:

a first grip member configured to receive a first hand of the user; and a second grip member configured to receive a second hand of the user; and a rotatable input mechanism attached to a bottom side of one of the first grip member or the second grip member.

11. The controller device of claim 10 further comprising an aperture for receiving said rotatable input mechanism, wherein the aperture is disposed on an interior of the first grip member.

12. The controller device of claim 11 wherein the rotatable input mechanism is configured to be rotated by a user's thumb while the first hand of the user holds the first grip member.

13. The controller device of claim 11 wherein the rotatable input mechanism is disposed adjacent to a user's thumb when the user grips the first grip member.

14. The controller device of claim 10 further comprising a motion sensor for detecting rotational movement of the rotatable input mechanism.

15. The controller device of claim 14 where the motion sensor communicates movement of the rotatable input mechanism to a game console.

16. The controller device of claim 10 wherein the controller device has a second input mechanism attached to the body, and wherein the rotatable input mechanism is configured to be rotated by a user's thumb while the user's other fingers engage the second input mechanism.

17. The controller device of claim 10 wherein a portion of the rotatable input mechanism extends through an aperture in the body.

18. The controller device of claim 17 wherein the aperture is disposed on an interior of the first grip member of the controller device.

19. The controller device of claim 18 wherein the rotatable input mechanism is configured to be actuated by a user through the aperture.

20. The controller device of claim 19 wherein the rotatable input mechanism is configured to be actuated by a user's thumb.

* * * * *